United States Patent
Liao

(10) Patent No.: US 6,179,397 B1
(45) Date of Patent: Jan. 30, 2001

(54) STRUCTURE FOR CONNECTING MAIN CIRCUIT BOARD RACK WITHIN COMPUTER HOUSING

(75) Inventor: Nien-Chiang Liao, Lu-Chou (TW)

(73) Assignee: Hon Hai Precision Ind. Co., Ltd., Taiepi Hsein (TW)

( * ) Notice: Under 35 U.S.C. 154(b), the term of this patent shall be extended for 0 days.

(21) Appl. No.: 09/472,650

(22) Filed: Dec. 27, 1999

(30) Foreign Application Priority Data

May 15, 1999 (TW) ................................. 88207778

(51) Int. Cl.[7] ........................................... A47B 96/06
(52) U.S. Cl. ........................................ 312/223.2; 361/727
(58) Field of Search ............................. 312/223.2, 223.1, 312/265.5, 263, 257.1; 361/727, 752, 796, 801

(56) References Cited

U.S. PATENT DOCUMENTS

| | | | |
|---|---|---|---|
| 5,159,528 | * 10/1992 | Murphy | 312/257.1 X |
| 5,242,061 | * 9/1993 | Lin | 361/801 X |
| 5,564,804 | * 10/1996 | Gonzalez et al. | 312/223.2 |
| 5,708,563 | * 1/1998 | Cranston, III et al. | 361/796 |
| 5,865,518 | * 2/1999 | Jarret et al. | 312/223.2 |
| 5,913,581 | * 1/1999 | Stephan et al. | 312/223.2 |
| 6,030,062 | * 2/2000 | Chen et al. | 312/223.2 |

* cited by examiner

*Primary Examiner*—Jose V. Chen
*Assistant Examiner*—Michael J. Fisher
(74) *Attorney, Agent, or Firm*—Wei Te Chung

(57) ABSTRACT

A structure for mounting a main circuit board in a computer housing includes a main circuit board rack, a rail formed on the drive cage of the computer housing, posts defined on the bottom panel of the computer housing and on the rack, and slots defined in the rail and on the rack. The upper and the lower edges of the rack are respectively bent into an upper flange and a lower flange for respectively contacting the rail and the bottom panel. The lower flange has slots to engage the posts of the bottom panel. The upper flange has posts to engage the slots of the rail. Each of the slots is in the shape of an L and includes a guiding portion and a main portion to provide the corresponding post self-guiding interengagement therein.

20 Claims, 5 Drawing Sheets

STRUCTURE FOR CONNECTING MAIN CIRCUIT BOARD RACK WITHIN COMPUTER HOUSING

BACKGROUND OF THE INVENTION

1. Field of the Invention

The present invention relates to an improved structure for connecting the rack of the main circuit board in a computer housing, and particularly to a rack with a slidable structure that facilitates convenient assembly during manufacturing.

2. The Related Art

The assembly of computers is an extremely competitive industry where the most successful competitors often have the most expeditious assembly process. Cheaper and cheaper computer hardware and software continues to be developed, increasing the relative importance of the cost of assembly, and providing an increased portion of profit margin from new developments in assembly. A conventional computer housing is shaped like a box enclosed by bottom, top, front, rear and a side panels, its interior containing subsystem components, such as disk drives, a CD-ROM, a motherboard, and a switching power supply. A front panel is adapted to expose the face of Floppy Disk Drives (FDD) and Compact Disc Drives (CD), and a rear panel is adapted to accommodate inputs and outputs, while a side panel is adapted to fix the motherboard thereon. Such a housing is adapted for assembling in a single assembly line. Since assembly can be very complicated and involve numerous components in such a computer, especially for multi-media computers, quality control on the single assembly line can be difficult. When problems occur in one of the assembly links, the entire assembly line may be halted.

Further, due to the compact, internal space of the computer and the packed arrangement of the components in the computer, the assembly of a motherboard is the most time-consuming workstation and the most likely to cause delays in the assembly line as a result of inefficiency.

The present invention overcomes the above disadvantages by providing an improved structure for connecting the main circuit board rack in the computer housing.

SUMMARY OF THE INVENTION

It is, therefore, an object of the present invention to provide an improved structure for connecting a main circuit board rack in a computer housing, thereby allowing the computer housing to be manufactured in two assembly lines, the main circuit board being assembled to the rack at one workstation to form a module, and then being slidably assembled into the computer housing on a main assembly line, thereby increasing manufacturing efficiency, elevating productivity, and yielding better control over quality, thereby reducing the manufacturing cost.

It is another object of the present invention to provide an improved structure for guidingly engaging and securing a main circuit board within a computer housing.

It is a further object of the present invention to provide a main circuit board rack for being mounted in a computer housing by self-guiding interengagements collaborating with only one fastener.

A structure for mounting a main circuit board in a computer housing according to the present invention includes a main circuit board rack, a rail formed on the drive cage of the computer housing, posts defined on the bottom panel of the computer housing and on the rack, and slots defined in the rail and on the rack. The upper and the lower edges of the rack are respectively bent into an upper flange and a lower flange for respectively contacting the rail and the bottom panel. The lower flange has slots to engage the posts of the bottom panel. The upper flange has posts to engage the slots of the rail. Each of the slots is in the shape of an L and includes a guiding portion and a main portion to provide the corresponding post with self-guiding interengagement therein.

Other objects, advantages and novel features of the invention will become more apparent from the following detailed description of a preferred embodiment thereof when taken in conjunction with the accompanying drawings, wherein:

DETAILED DESCRIPTION OF THE PREFERRED EMBODIMENT

Figure 1:
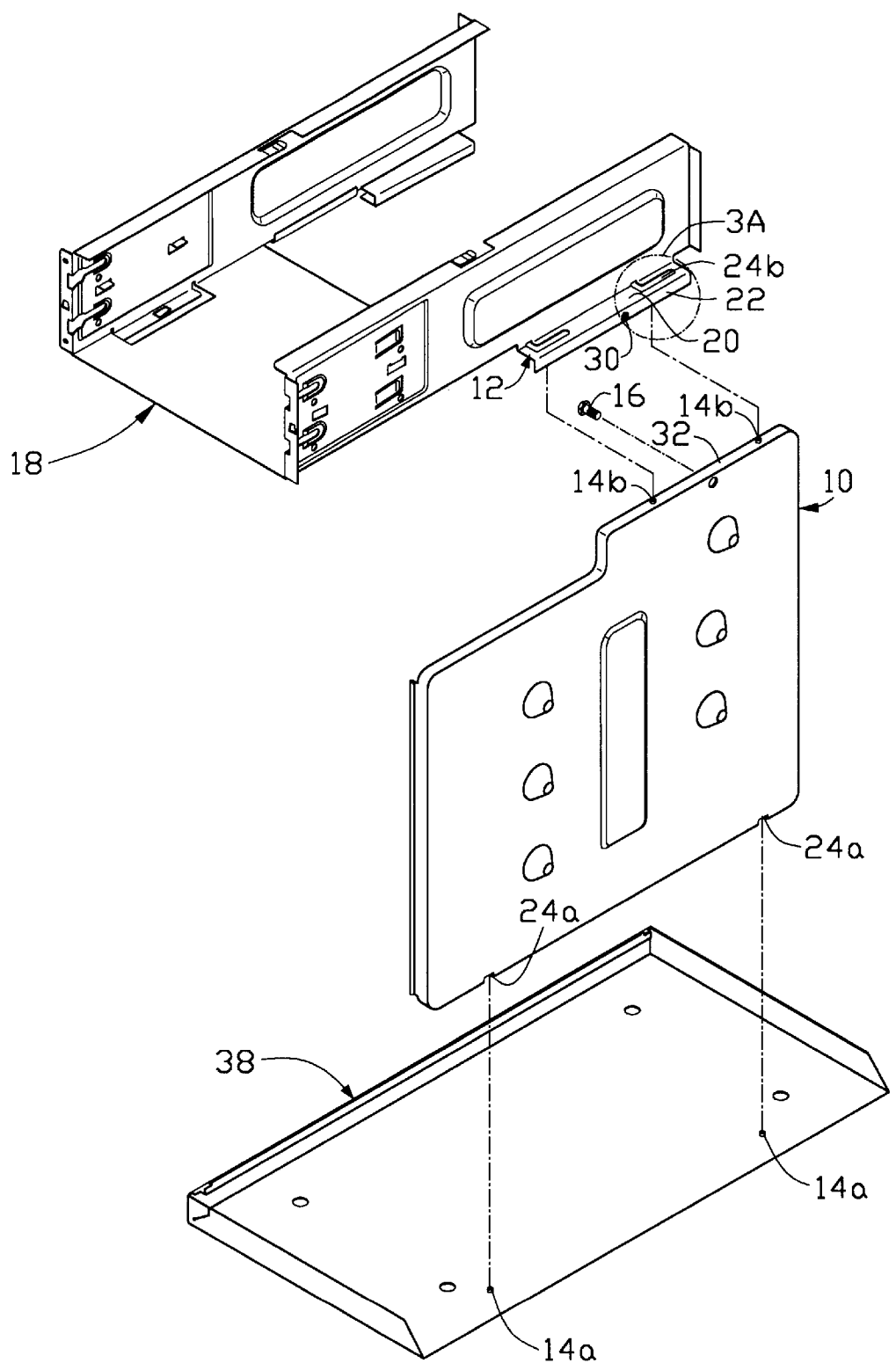
FIG. 1 is a partial, exploded view of a computer housing showing a main circuit board mounting system of the present invention.

It is noted here that for facilitating understanding like components are designated by like reference numerals throughout the embodiment of the present invention as shown in the attached drawing figures.

Figure 2:
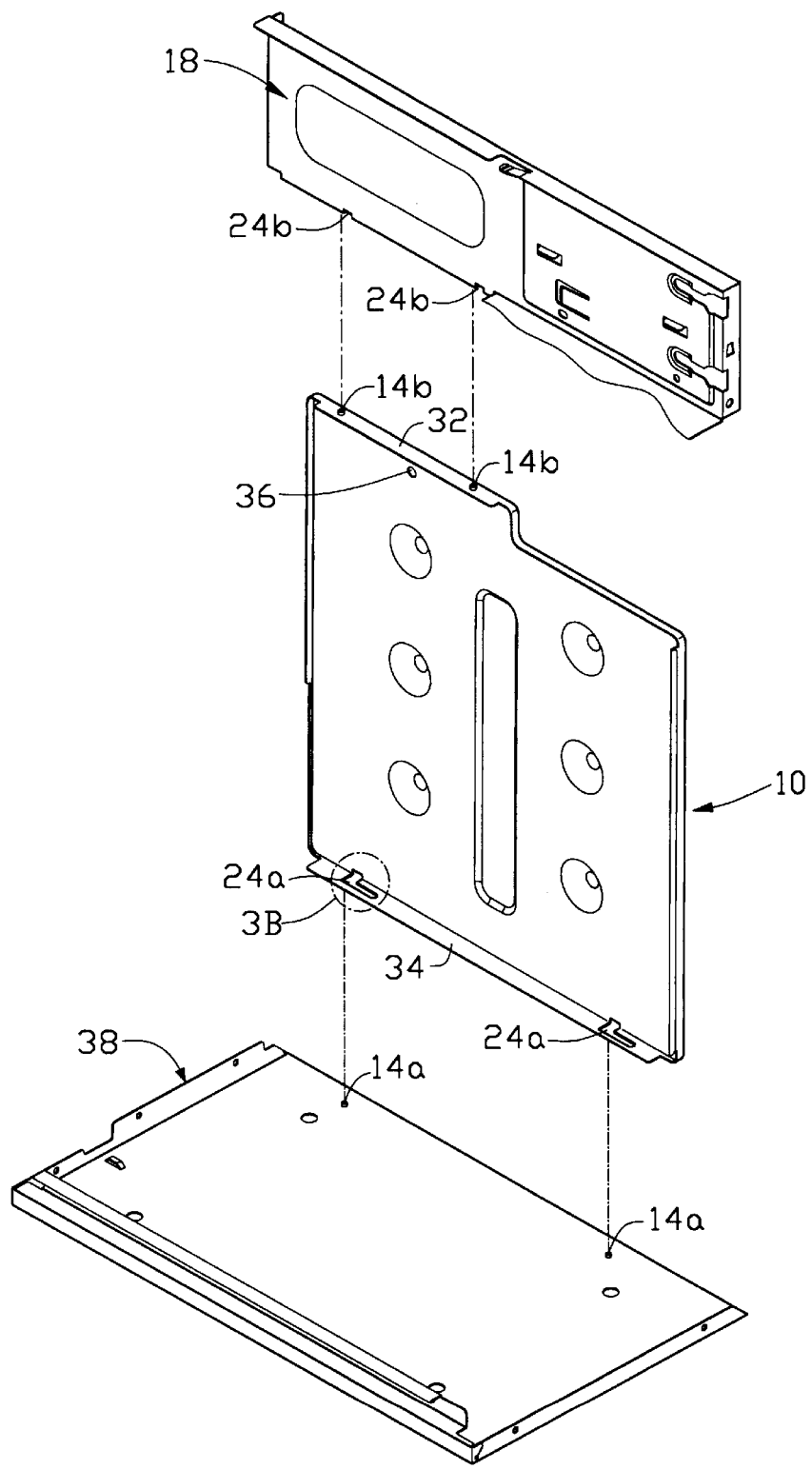
FIG. 2 is another exploded, perspective view of FIG. 1.

The present invention is applicable to general computer systems including personal computers, servers and other devices mounting main circuit boards. To facilitate description of the present invention, a personal computer with a motherboard is used as an example. FIGS. 1 and 2 illustrate a structure for mounting a motherboard in a computer housing which comprises a rack 10, a guide rail 12, posts 14a, 14b and corresponding slots 24a, 24b, and a fastener 16. The rack 10 is in a planar board shape mounted and retained between two members in the computer housing. One of the members is a drive cage 18, the other is a bottom panel 38. The guide rail 12 is formed by extending a side edge of the drive cage 18 outwardly and then bending it vertically downward into an L-shape, forming a horizontal flat board portion 20 and a vertical retaining board portion 22. A pair of slots 24b is defined in the flat board portion 20. The posts 14a, 14b are formed on an inner surface of the bottom panel 38 and on an upper edge of the rack 10.

The upper and the lower edges of the rack 10 are respectively bent into an upper flange 32 and a lower flange 34 extending in the same direction. The upper flange 32 and the lower flange 34 respectively contact the flat board portion 20 of the rail 12 and the bottom panel 38 and are limited therebetween. The upper flange 32 forms two posts 14b extending upwardly for engaging with corresponding slots 24b in the flat board portion 20. The lower flange 34 defines two slots 24a to engage with two corresponding posts 14a which are formed on the bottom panel 38. The posts 14a, 14b may slide in and self-guidingly interengage with the corresponding slots 24a, 24b, which makes the rack 10 slidably mounted between the rail 12 and the bottom panel 38.

Figure 3A:
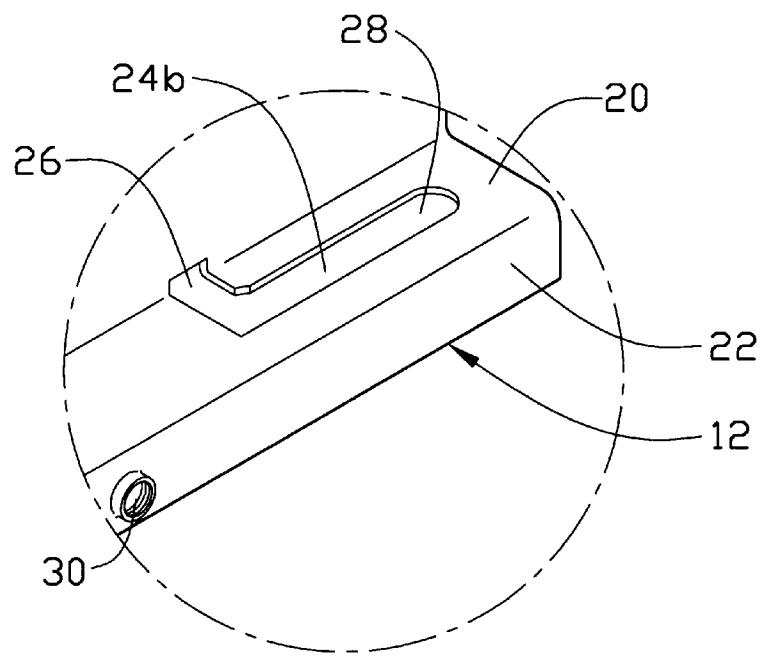
FIG. 3A is a partial, enlarged view of a drive cage of the computer housing showing an engaging hole.
Figure 3B:
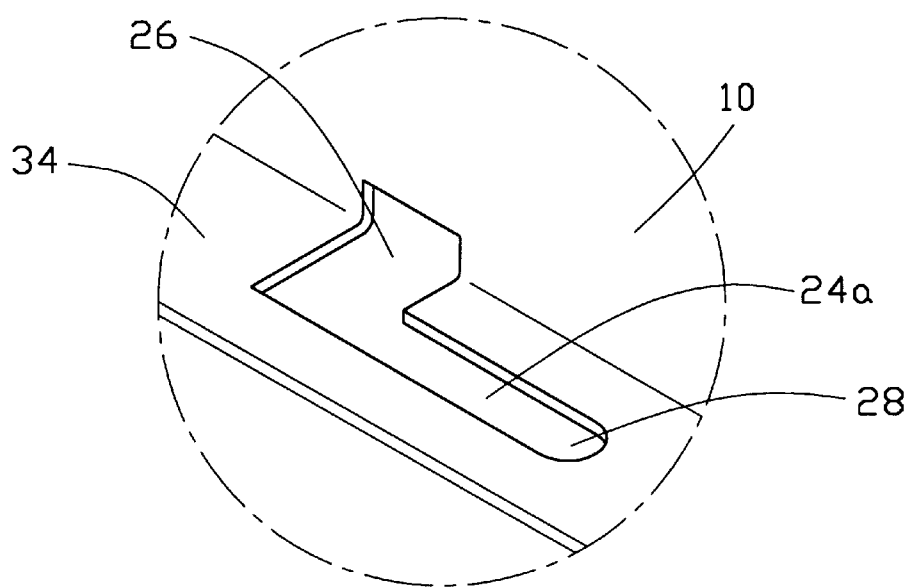
FIG. 3B is a partial, enlarged view of a rack of the present invention showing another engaging hole.

Referring to FIGS. 3A–3B, each of the slots 24a, 24b is L-shaped and comprises a guiding portion 26 and a main portion 28. The slot 24b of the rail 12 is illustrated in FIG. 3A, where the guiding portion 26 is seen to extend through a wall of the drive cage 18 to a middle of the flat board portion 20, where it connects at a right angle with the main portion 28. The slot 24a of the lower flange 34 of the rack 10 is illustrated in FIG. 3B, where it is shown to extend through the body of the rack 10 to a middle of the lower flange 34, where it connects at a right angle with the main portion 28. The guide portion 26 of each slot 24a or 24b is wider than the main portion 28, allowing a post 14a or 14b to enter the corresponding slot 24a or 24b at a guide portion 26 and to slidingly move in the main portion 28, where it is restrained from vertical movement. Referring to FIG. 3A and FIG. 2, there is a first hole 30 defined in the retaining board portion 22 of the rail 12, and the rack 10 defines a second hole 36 corresponding to the first hole 30 for insertion of the fastener 16 therethrough. The hole 30 may be a screw hole and the fastener 16 may be a bolt capable of engaging with the hole 30, allowing it to fasten the rack 10 to the guide rail 12.

Figure 4:
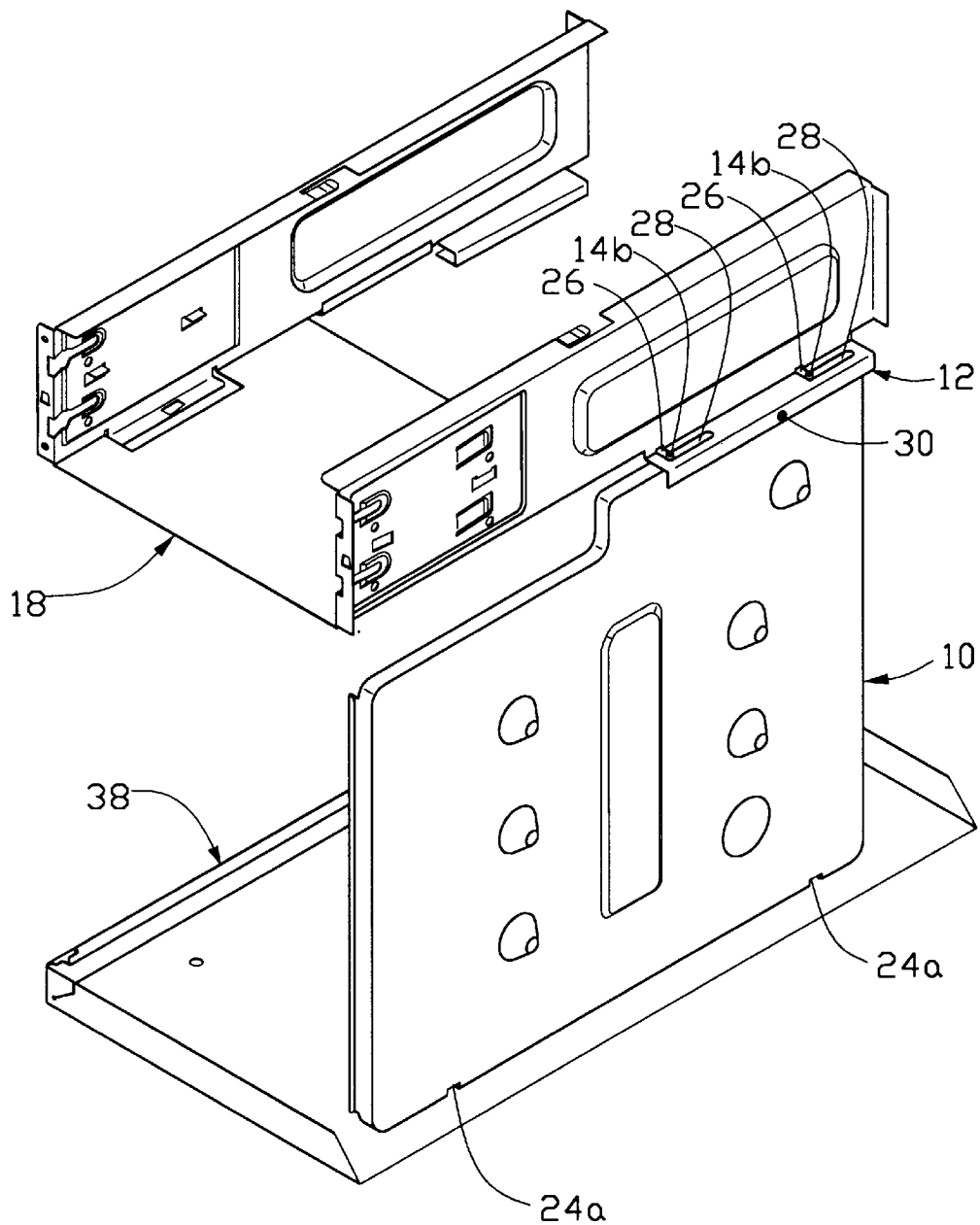
FIG. 4 is a perspective view illustrating the assembly operation of the present invention.
Figure 5:
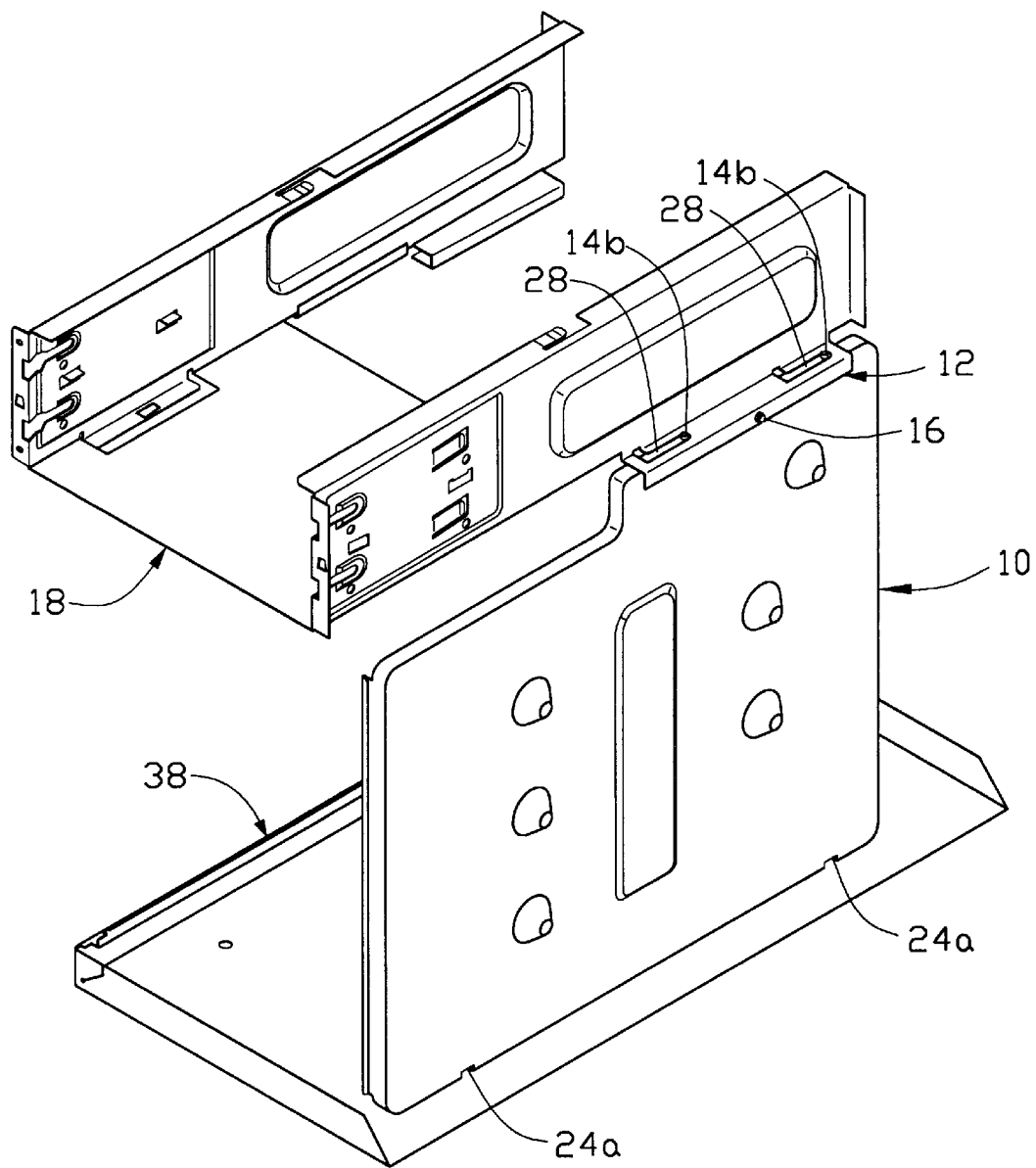
FIG. 5 is another perspective view illustrating the assembly operation of the present invention.

FIGS. 4–5 illustrate the assembly of the rack 10 in the computer housing. Firstly set the rack 10 between the drive cage 18 and the bottom panel 38 and align the posts 14a, 14b with the corresponding guiding portions 26 of the slots 24a, 24b. Then push the rack 10 so that the posts 14a, 14b slide along the corresponding guiding portions 26 to the main portions 28, as shown in FIG. 4. Finally, as shown in FIG. 5, slide the rack 10 along the rail 12 so that the posts 14b of the upper flange 32 slide in the corresponding main portions 28 of the rail 12 and the posts 14a of the bottom panel 38 slide in the corresponding main portions 28 in the lower flange 34 of the rack 10. The first and the second holes 30, 36 should now align with each other. By locking the fastener 16 in the first and the second holes 30, 36, the rack 10 is firmly secured in the computer housing.

The primary objective of the present invention is to provide an easily installed main circuit board rack 10 which will allow a main circuit board to be separately assembled to the rack 10 at a separate workstation and which can then be quickly installed in the computer housing in an assembly line, thereby increasing manufacturing efficiency, elevating productivity, and providing better quality control, thereby reducing the manufacturing cost.

While the present invention has been described in reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

What is claimed is:

1. A structure for mounting a main circuit board in a computer housing comprising:
    a first member having a flat board portion and defining a first hole;
    a second member spaced from the first member;
    a rack for supporting a main circuit board received between the first and second members, the rack having first and second flanges respectively contacting the first member and the second member, said rack defining a second hole corresponding to the first hole;
    a first slot being formed in the first member and a second slot formed in the second flange;
    a first post being formed on the the first flange and a second post being formed on the second member, each post being slidably interengaged with the associated slot; and
    a fastener received in the first and second holes.

2. The structure of claim 1, wherein the first member is a drive cage and the second member is a bottom panel of the computer housing.

3. The structure of claim 2, wherein the first slot is formed on the flat board portion for engaging with the first post on the upper flange that contacts the flat board portion.

4. The structure of claim 2, wherein the second post is formed on an inner surface of the bottom panel for engaging with the second slot formed on the lower flange, and the lower flange contacts the bottom panel.

5. The structure of claim 2, wherein a guide rail comprises a flat board portion outwardly extending from a side edge of the drive cage, the first slot being defined in the flat board portion.

6. The structure of claim 5, wherein the guide rail further comprises a retaining board portion perpendicularly extending from the flat board portion with the first hole formed therein.

7. The structure of claim 1, wherein each slot comprises a wide guiding portion for facilitating entry of the corresponding post into the slot and a narrow main portion for retaining the post therein.

8. The structure of claim 7, wherein the guiding portion is perpendicular to the main portion.

9. Guiding means for a main circuit board rack adapted to slidably mount the rack between first and second members in a computer housing, comprising:
    a guide rail adapted to be mounted to the first member;
    a first slot defined in the guide rail and a second slot defined in the rack;
    a first post mounted to the rack and a second post adapted to be mounted to the second member;
    two slots respectively formed in the rack and the guide rail for respectively receiving the corresponding posts therein, each of said slots comprising a wide guiding portion for facilitating entry of the corresponding post therein and a narrow main portion for interengaging and retaining the post therein.

10. The guiding means of claim 9, wherein the guiding portion is perpendicular to the main portion.

11. The guiding means of claim 9, wherein one of the members is a drive cage and the other is a bottom panel of the computer housing.

12. The guiding means of claim 11, wherein the guide rail comprises a horizontal flat board portion attached to the first member and a retaining board portion perpendicularly extending from the horizontal flat board portion, forming an L-shape.

13. The guiding means of claim 9, wherein first and second flanges perpendicularly extend from opposite edges of the rack for respectively contacting the first and second members.

14. The guiding means of claim 13, wherein one slot is formed on the flat board portion for engaging with one corresponding post formed on the upper flange and the other post is formed on the inner surface of the bottom panel for engaging with the other slot formed on the lower flange.

15. A structure mounting a rack of a main circuit board in a computer housing comprising:
    at least one post formed in the computer housing;
    at least one slot defined in the rack, the slot having a wide guiding portion and a narrow main portion, the rack being slidable relative to the computer housing such that when the rack is set and slid in the computer housing the post enters the slot through the guiding portion and slides along the main portion thereby interengaging with the slot;

aligned holes defined in the computer housing and the rack; and a fastener received in said holes.

16. The structure of claim 15, wherein the guiding portion and the main portion are perpendicular and connected to each other.

17. The structure of claim 15, wherein one side of the rack is bent to form a flange to contact the inner surface of the computer housing.

18. The structure of claim 17, wherein the slot is defined in the flange.

19. A computer housing comprising:

a drive cage, the drive cage having a guide rail, the guide rail extending from a side of the drive cage and having a flat board portion and a retaining board portion, wherein the flat board portion defines a first slot and the retaining board portion defines a first hole;

a bottom panel having a second post on its inner surface;

a main circuit board rack slidably mounted between the rail and the bottom panel, the rack having an upper and a lower flanges for respectively contacting the flat board portion and the bottom panel, the upper flange forming a first post being slidably interengaged with the first slot, and the lower flange defining a second slot for slidably interengaging with the second post, the rack further having a second hole aligned with the first hole; and a fastener inserted in said first and the second holes.

20. The computer housing of claim 19, wherein said rack is positioned in a vertical direction with regard to both the bottom panel and the drive cage, and said first and second posts extend along said vertical direction.

* * * * *